United States Patent [19]
Wells et al.

[11] 4,245,613
[45] Jan. 20, 1981

[54] TUNNEL OVEN

[75] Inventors: Harold D. Wells, St. Louis County; Kelly J. Wells, Ellisville; Dennis M. Weinberg, St. Louis County, all of Mo.

[73] Assignee: Black Body Corporation, Fenton, Mo.

[21] Appl. No.: 956,869

[22] Filed: Nov. 1, 1978

[51] Int. Cl.[3] .......................... A21B 1/00; F27D 11/00
[52] U.S. Cl. ................................. 126/19 R; 219/413; 219/388; 219/345; 126/275 E
[58] Field of Search ............... 219/413, 405, 411, 345, 219/342; 126/19 M, 19 R, 275 E

[56]  References Cited
U.S. PATENT DOCUMENTS

| | | | |
|---|---|---|---|
| 3,030,486 | 4/1962 | Lashley | 219/413 |
| 3,033,968 | 5/1962 | Julie | 219/413 |
| 3,400,886 | 9/1968 | Holtkamp | 219/413 |
| 3,515,845 | 6/1970 | Williams | 219/388 |
| 3,809,859 | 5/1974 | Wells | 219/345 |
| 4,008,996 | 2/1977 | Wells | 126/19 R |
| 4,134,005 | 1/1979 | Eppens | 219/413 |

*Primary Examiner*—Samuel Scott
*Assistant Examiner*—Wesley S. Ratliff, Jr.
*Attorney, Agent, or Firm*—Kalish & Gilster

[57]  ABSTRACT

A tunnel oven includes a framework forming an elongated cooking tunnel with an entrance at one end for ingress of products to be heated in the tunnel during traverse through the tunnel and an exit at the opposite end for egress of heated products. A conveyor of either in-line type with over-and-under reaches or a return type with coplanar reaches conveys products from the entrance to the exit. The tunnel floor is a plate constituting a hearth. Infrared radiant heater panels along the tunnel length above and below the hearth provide heat. Pairs of thermocouples arranged in two sets, each set having an upper and lower thermocouple, to provide sensing of the temperatures of the hearth and the upper heating elements. The sets are located at predetermined distances from the entrance and exit, respectively, with temperature controllers being interconnected with the hearth and roof heater panel temperature sensing elements, respectively, for controlling energization of the radiant heater panels by proportional control. The first set of temperature sensors is located for being responsive to ingress of cool products to be heated. The temperature controllers connected with the thermocouples which sense the hearth and roof source temperatures, respectively, preferably are responsive to the arithmetic means of temperatures respectively sensed by the temperature sensing devices.

14 Claims, 13 Drawing Figures

TUNNEL OVEN

BACKGROUND AND SUMMARY OF THE INVENTION

The invention relates to heating or cooking apparatus, and, more particularly, to an improved tunnel oven for heating food or other products while being conveyed from a tunnel entrance through the oven to the tunnel exit within a preselected time.

It is previously been known to provide multiple tier ovens of the tunnel type. Such an oven is disclosed in co-assigned U.S. Pat. No. 4,008,996 of Harold D. Wells, entitled "Multiple Tier Oven". Said patent discloses a multiple tier oven with a plurality of superimposed tunnel-form oven chambers. Each of the tunnels is provided with a plurality of infrared emitter panels along the roof thereof for heating purposes which are of the form disclosed in U.S. Pat. No. 3,809,859 of Harold D. Wells. The panels radiate heat downwardly into their respective chambers, but also cause heating the floor, or hearth, of the next higher chamber, the lowermost chamber having both roof and floor heating panels. A single thermocouple is associated with the panels of each tier for sensing the temperature thereof, such thermocouple being connected with a temperature controller which controls the electrical energization of resistance elements of each of the panels. In that prior art arrangement, all of the heating panels of a tier thus are controlled by a single temperature sensing means.

Accordingly, in this prior art oven arrangement a single temperature control is associated with each tier to provide a means for setting a preselected temperature. The control provides time-proportioning energization of the resistance elements of the panels in accordance with the setting by switching the electrical power on and off at a relatively rapid interval in accordance with the temperature sensed by the sensing means associated with each tier.

While the oven described in said U.S. Pat. No. 4,008,996 has proven to be extraordinarily advantageous in numerous and attained great commercial success, it has been found that certain limitations are necessarily imposed upon its flexibility by design features inherent therein. As alluded to above, the infrared emitter panels which constitute the roof of each tier provide some heating of the floor (or hearth) of next higher tier, but such heating is at the expense of accurate temperature control of the higher tier if the difference between the temperatures selected for each tier exceeds a given value. Thus, flexibility in use is limited to some extent by the need to operate the oven so that the temperature set for each tier does not exceed a certain differential between adjacent tiers.

It has been found desirable to employ in ovens of the presently disclosed character a tunnel of the form having a metal hearth comprised of thermally conductive sheet material, such as steel. Moreover, it is now found to be desirable to utilize the hearth as one source of heat for cooking a food article through the tunnel while utilizing the infrared emitter panels of the roof as another source of heat for cooking of the food articles. Under these circumstances, it has been found frequently advantageous to operate the oven with the hearth of a given tier at a different preselected temperature from the temperature of the roof infrared emitter panels. Such feature could not be conveniently provided with a multiple tier oven of the type noted in the above identified patent without limiting the differences in temperatures between different tiers.

While it is desirable to provide such flexibility in the operation of an oven as described above, it is a matter of importance to ensure that temperatures within the oven chamber, i.e., the tunnel of each tier, be maintained relatively constant. Otherwise, cooking of food articles as desired in accordance with the preset temperature will not be effected, with the further possibility that food products cooked at different times may be cooked to different degrees of doneness so as to result in nonuniformity of heated food products.

When cold food articles are introduced to the tunnel entrance, it is found that heat transfer between the heat sources, i.e., roof heater panels and the hearth, and the cold food products is considerable. This condition is aggravated when the food products are frozen. The heat transfer initially reduces the temperature within the tunnel so that the single temperature sensing arrangement causes the temperature controller to provide increased energization of the heater elements of the infrared panels. This ultimately can produce an overshoot of the temperature within the oven so that food articles may be exposed to excessively high heat and, therefore, be burned upon the outside layers or interior portions of the articles may not be sufficiently cooked.

Thermal overshoot can be avoided by the use of a hearth of very high thermal mass, such as a very thick plate of steel. But such a hearth is undesirable because of the weight and expense. In the absence of such provision, the single temperature sensing arrangement currently employed, such temperature overshoot conditions may prevail or the temperature sensing arrangement will be responsive to only one end of the tunnel. For example, if no product is near the temperature sensing element, heating is reduced irrespective of the presence of a food article still within the tunnel. Consequently, the temperatures along the length of the tunnel may be essentially non-uniform and, at worst, subject to great extremes.

Another problem inherent in using a hearth having a high thermal mass is that there is a reduction in the speed of the oven to different masses in quantities of articles or different densities of articles passing through the oven. In other words, the oven will not be able to adjust quickly to provide the requisite conditions for the proper, uniform, and precise heating of the articles. Although it is desirable to provide low thermal mass and also to provide high watt density of the infrared heater panels in order to provide quick response, as the thermal mass decreases and the watt density increases, it has been found that the tendency of the oven to become thermally unstable increases drastically. Therefore, even tighter temperature regulation must be provided. Here, utilizing a single temperature sensing element of the prior art has not been found to be practical. Even if multiple temperature sensing elements are employed, impermissibly high temperature variations along the length of the tunnel may result and operation has not proven satisfactory for ovens of the character disclosed until the present invention.

Accordingly, an object of the invention is the provision of an improved tunnel oven for heating various products, and particularly food products, as the products are conveyed through a heating tunnel.

A further object of the invention is the provision of such a tunnel oven which employs an oven tier unit which is of a modular nature for providing the oven with a desired number of tiers, each having a tunnel-form oven chamber.

Another object of the invention is the provision of such a tunnel oven which provides preselected accurate temperatures in each tunnel of the oven for accurate, stable, predictable, repeatable heating of products therein.

Another object of the invention is the provision of such a tunnel oven which may optionally utilize either an in-line or return-type conveyor for conveying food products through the oven chamber.

A still further object of the invention is the provision of an improved tunnel oven providing high wattage infrared energy heating of products during their conveyance through a tunnel-form oven chamber yet which does not exhibit thermal instability, such as temperature overshoot, and particularly such a tunnel oven extremely well-suited to the precise, uniform, flexible, and high speed heating of food products of various types.

Yet another object of the invention is the provision of a multiple tier oven permitting substantial temperature differentials between adjacent tiers without detrimental effect upon conditions within the oven chamber of any one of tiers.

Among additional objects of the invention are the provision of a tunnel oven providing extreme flexibility in the preselection of heating conditions, including preselected temperatures, within an oven chamber tunnel; the provision of such a tunnel oven which is suited for uniform, precise heating of products under various product input conditions, various product input temperatures, and various rates of input; the provision of such a tunnel oven which is comprised of a simplicity of sturdy components conducing to longevity of usage and reliability; which may be produced economically; which permits economical field installation of additional oven tiers without difficulty or complexity; and which is of such simplicity that it does not require the services of a skilled individual for satisfactory operation.

Other objects will be in part apparent or are pointed our hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Referring now by reference numerals to the drawings, A designates generally a tunnel oven of the invention of a first preferred embodiment. The oven is intended primarily for the heating within a tunnel, i.e., for cooking of food. Although the oven is illustrated as having a single tier, it is to be understood that the oven is of a stackable nature to permit provision of additional tiers of the oven stacked one above another in a manner described below.

Primarily, the oven is intended for heat and serve purposes wherein partially prepared or frozen foods may be subjected to requisite heating for prompt serving of the same. Hence, the oven is particularly adapted for what is known as fast food service, and especially where there is a demand for servings in relative volume in minimum time. Oven A has manifest applications for industrial and commercial use. Therefore, it is to be understood that any description hereinbelow of the use of said oven in conjunction with the cooking or other heating of food articles or items is merely exemplary and is not to be interpreted as restrictive. Although various food articles and other comestibles may be heated within the oven, as for the cooking of the same, other non-food items or articles may well be heated in the oven to advantageous effect.

Oven A includes a tier deck of unit 21 having an enclosure 22 of rectangular character having panels providing a front 22a, top 22b, back 22c, bottom 22d, and right and left ends 22e, 22f, provides the enclosure oven chamber 23 in the form of a tunnel extending between the ends 22e, 22f having an entrance 25 at end 22e and an exit 27 and the other end 22f. A framework F which forms the tunnel is shown in FIGS. 8-11. The specific features thereof will be clarified and more readily understood by reference to the description which follows. However, the framework is not a matter of criticality and reference may be had to the above-identified Wells U.S. Pat. No. 4,008,996 for a description of the frame construction details utilizeable in principle for constructing tunnel ovens of the present character.

Legs 29 and 29', each having a pair of castering-type wheels 30 spaced transversely at corners of each leg, are secured to opposite ends of unit 21 to serve as a base for supporting the oven with a height convenient for use. Legs 29, 29' are preferably constructed of strong, rigid stock, i.e., of welded sheet steel, to provide a sufficient margin of strength for the stacking of additional tiers on the oven, as may be subsequently desired in accordance with later recognized need for increased oven capacity. The wheels permit oven A to be mobile for facilitating its transport to desired locations, for ready movement for cleaning or the like, or for the ordinary repositioning in use as may be requisite.

Oven tier unit 21 is provided with a conveyor 31 for conveying food products through said tunnel 23 from the entrance 25 to the exit 27 of the tunnel. Conveyor 31 comprises a plurality of conveyor racks 31a–31f visible in the drawings, there being two additional conveyor racks within tunnel 23, i.e., the oven chamber, one of which racks 31g is visible in FIGS. 1 and 2.

Figure 3:
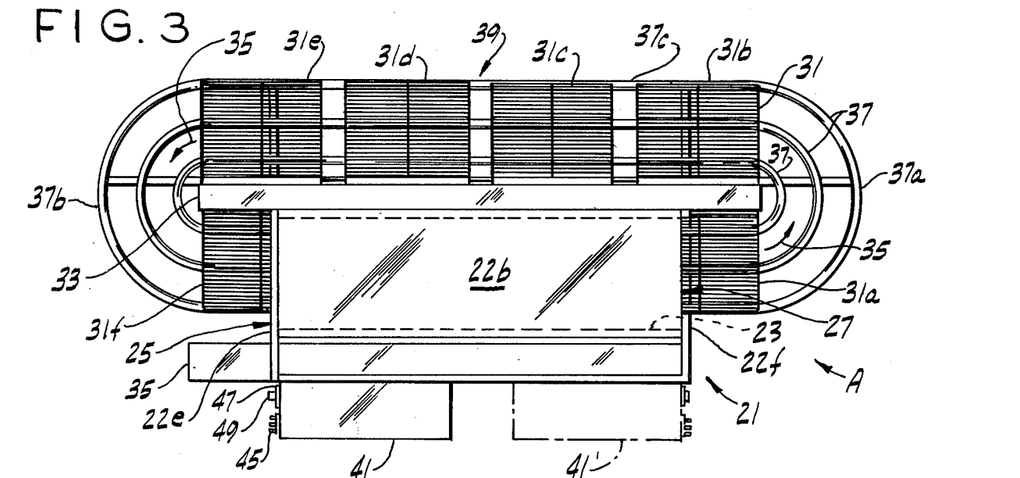
FIG. 3 is a top elevation of a return conveyor oven of the configuration shown in FIG. 1.

Said racks are carried by means of a motor-driven continuous chain which is contained within a housing 33 for movement as indicated by arrows 35 in a counter-clockwise direction as viewed in FIG. 3 from the top. However, the direction of rotation is a matter of choice. If desired, clockwise rotation may be employed so that, accordingly, stacked tier units in an oven of a multiple tier configuration, as described below, may have the respective conveyors moving in different directions where necessary.

Principles of a motor-driven chain arrangement disclosed in said Wells U.S. Pat. No. 4,008,996 may be employed in the mechanism for driving conveyor 31 except that the same is utilized in the present configuration only for driving the conveyor of a single tier, the motor and appropriate reduction gearing for the motor being of a conventional type and contained within a suitable housing 35 to the right side of tunnel entrance 25. In any event, the construction of the presently contemplated conveyor arrangement will be within the purview of the skilled mechanic in view of the teachings of said U.S. Pat. No. 4,008,996.

Conveyor racks 31a–31f, etc., which may be of a readily removable character to permit their being lifted off for cleaning purposes, are ordinarily supported in normal usage on oven unit 21 while outside of the oven chamber by a plurality of rails 37 having curved portions 37a, 37b at opposite ends and a straight portion 37c interconnecting them to provide an upper surface for supporting the conveyor racks. This upper surface is coplanar with the floor of tunnel 23 so that the conveyor arrangement provides an inner course within tunnel 23 which is coplanar with an outer or return course of the conveyor. An advantage of this arrangement is that the return course constituted by rail portions 37c provides a frontal loading area designated generally at 39 for facile on-loading of food products to be heated and off-loading of heated food products which have been returned to loading area 29 after passing through tunnel 23. This provides a most convenient arrangement in fast food cooking and service, but at the expense of increased depth of the unit. The advantages, however, for frontal loading in multiple tiered configurations of the invention will be manifest.

The motor for driving said conveyor 31 is preferably of a suitable commercially available DC type and is, therefore, not shown. The motor is interconnected with circuitry as described in the co-assigned, copending application of Dennis M. Weinberg et al, Ser. No. 819,151, filed Aug. 26, 1977, for "Process Time Control System." Said system is adapted to control the energization of the motor so as to provide for a preselected time for a product to traverse the distance from the entrance 25 to the exit 27. For this purpose, conveniently presented at the face of a control console or enclosure at one side of entrance 25 is a processing time control unit 43 having means such as thumbwheel or pushbutton digital select switches 45 for programming the processing time control means 43 to provide a preselected heating time in which the motor will convey a food product from entrance 23 through the tunnel 25 to exit 27. Said unit 43 advantageously permits the cooking time for food products to be directly in terms of conventional units of time, such as from 1 minute to 99 minutes, for example.

Contained also within said housing or enclosure 41 and presented at the face thereof adjacent speed control unit 43 are a pair of temperature setting controls 47, 49 of identical nature for setting preselected temperatures which are to be maintained within tunnel 23. Temperature controls 47, 49 determine the temperatures of the respective upper and lower sources of heat for heating of food products in the tunnel. Said sources of heat are constituted by a plurality infrared emitter pannels located along the roof of the tunnel and by a plate 51 constituting a hearth forming the floor of the tunnel. Hearth 51 is heated by a plurality of infrared emitter panels located immediately below it. Control 47 permits preselection of a desired temperature of the roof emitter panels and control 49 permits preselection of a desired temperature of the hearth.

Enclosure 41 containing the process time and temperature controls is preferably located as indicated for convenience in use. However, alternative locations such as that indicated at 41' in FIG. 3 may be employed. Optionally, the process time and temperature control enclosure 41 may be located at the front of the unit, for example, at a position just above loading area 39 where it will not interfere with the loading or movement of food products carried on the conveyor racks.

Figure 1:
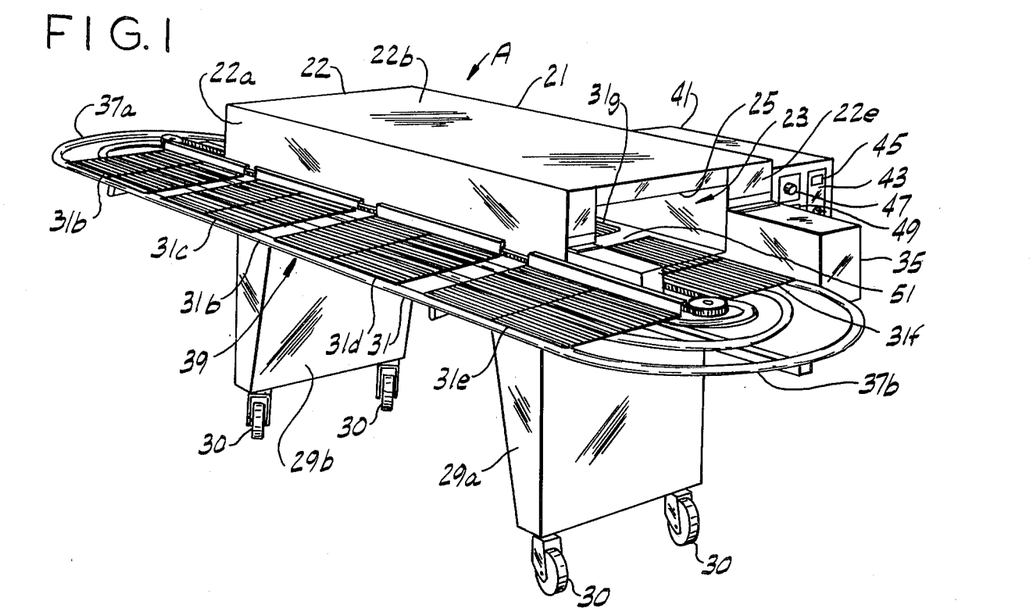
FIG. 1 is a perspective view of a tunnel oven of the invention having a return type conveyor.
Figure 2:
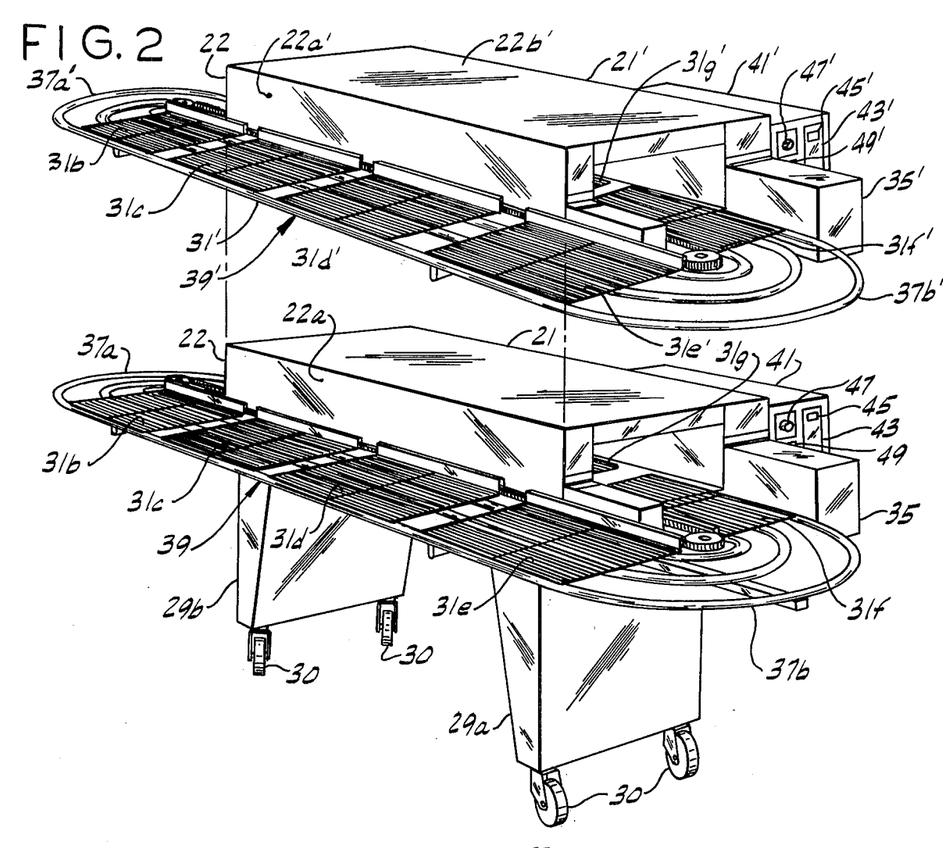
FIG. 2 is an installation of stacking of an additional tier providing a multiple tier tunnel oven of the return conveyor type shown in FIG. 1.
Figure 4:
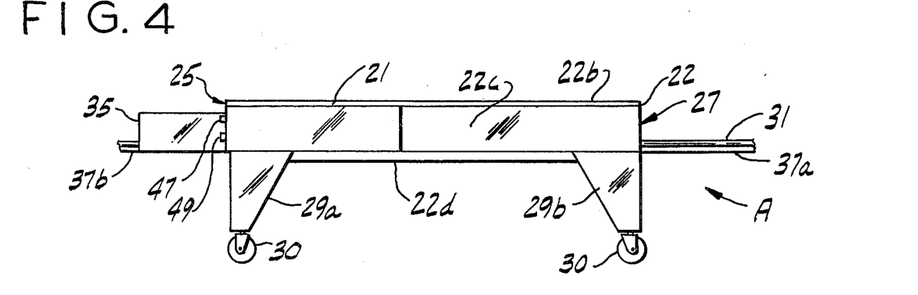
FIG. 4 is a side elevation of the oven of FIG. 1.

It may be noted that each oven unit 21 and its associated conveyor 31, process time control 43 and temperature controls 47, 49, as well as the drive motor for each conveyor 31 are self-contained distinct units of the character shown in FIGS. 1, 3, and 4. Because of the rectangular configuration and planar top and bottom of oven enclosure 22, units of the same character shown may be stacked in tier units to provide a multiple tier oven constituted by a plurality of units of the tunnel oven. Such an arrangement is illustrated in FIG. 2 wherein a unit 21' having an oven enclosure 22' is shown oriented for stacking upon unit 21, with alignment thereof preparatory to joining the units being illustrated by phantom lines. The units 21 and 21' upon stacking are secured together suitably, and requisite common interconnection with a source of AC power is then made as desired.

This arrangement greatly facilitates the later provision of additional oven tiers after an oven A of the configuration shown has been installed in a fast food location, for example, in which it is desired to add increased cooking capacity by the use of multiple tiers. As to unit 21', each of the constituent elements thereof which corresponds to that of tier unit 21 is identified by the same reference numeral, but followed by a prime symbol. For example, unit 21' has a conveyor 31' and an enclosure 22', etc.

Accordingly, it will be seen that a customer may purchase an oven A of the unit shown in FIGS. 1, 3, and 4 having a single tier 21 but, as need for increased capacity occurs, may purchase additional tiers 21', 22', etc. to be stacked one above another upon the first tier 21, utilizing the same legs 29a, 29b as a base for the multiple tier oven thus realized. Dependent upon the height of each tier enclosure 22, 22', etc., the oven may have several tiers with up to six tiers being a preferred maximum, for purposes of supporting the unit with the base shown and consistent with keeping the height of the composite unit within a reasonable maximum. When multiple tiers are employed, single front and/or rear face panels may be utilized to give an improved appearance.

Figures 5, 12, 13:
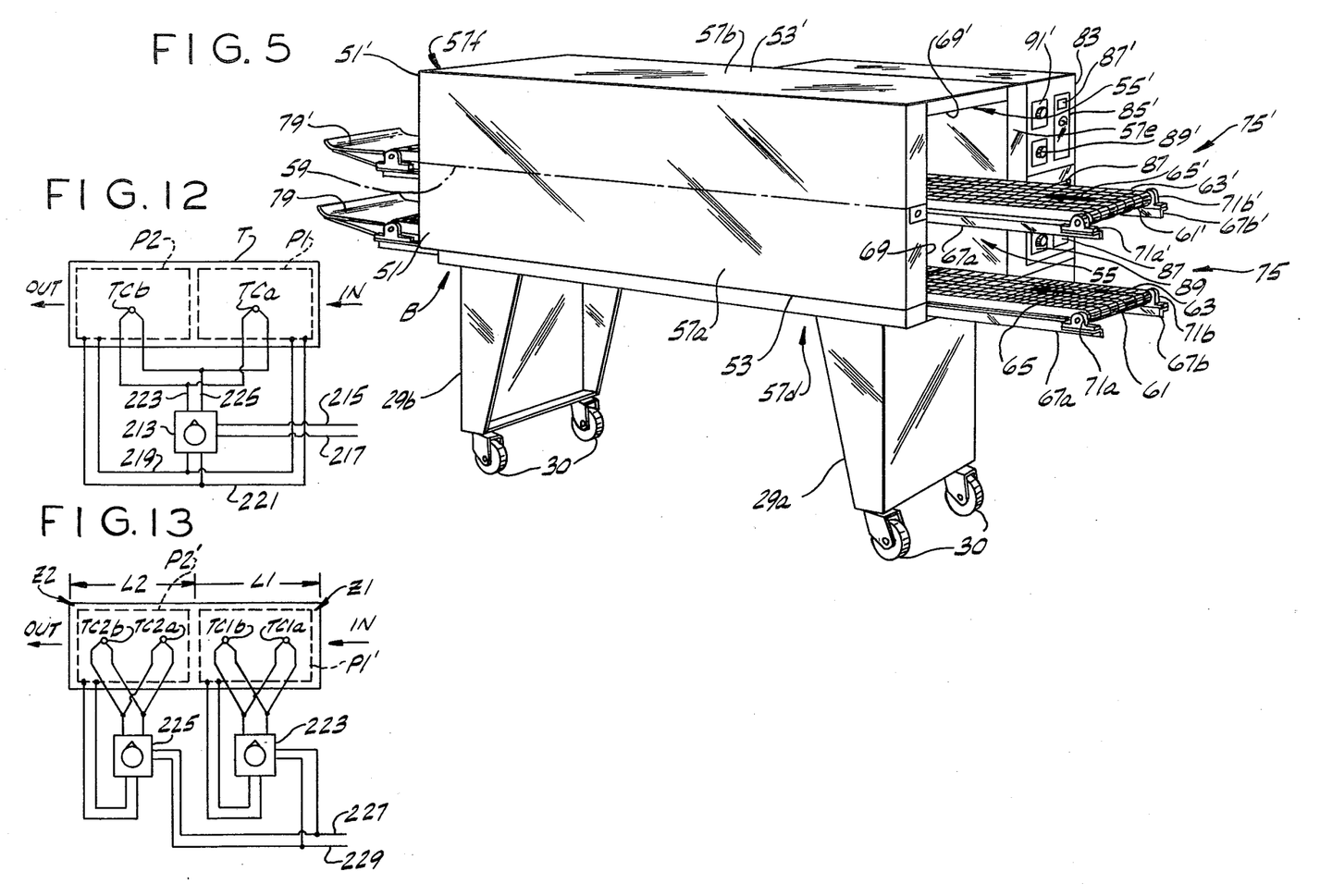
FIG. 5 is a perspective view of a tunnel oven of the invention having an in-line type conveyor but depicting the oven as having two tiers to provide a multiple tier in-line conveyor tunnel oven of the invention.
FIGS. 12 and 13 are schematic circuit diagrams of circuitry for temperature sensing and temperature controlling of the energization of infrared emitter panels utilized in both types ovens of the invention, for a single zone and dual zone oven chamber, respectively.
Figure 6:
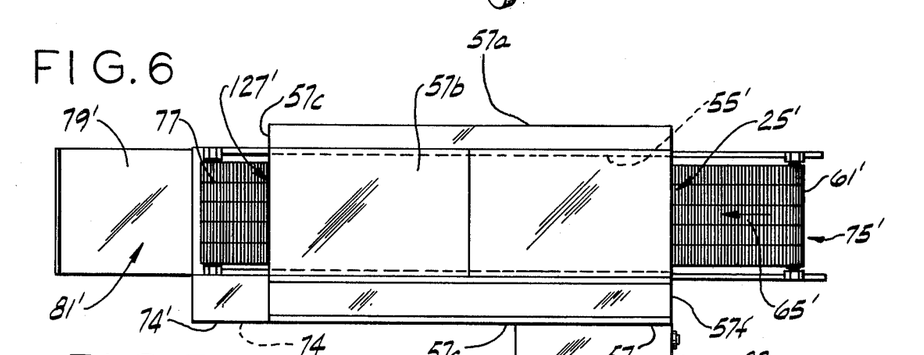
FIG. 6 is a top view of the in-line tunnel oven of FIG. 5.
Figure 7:
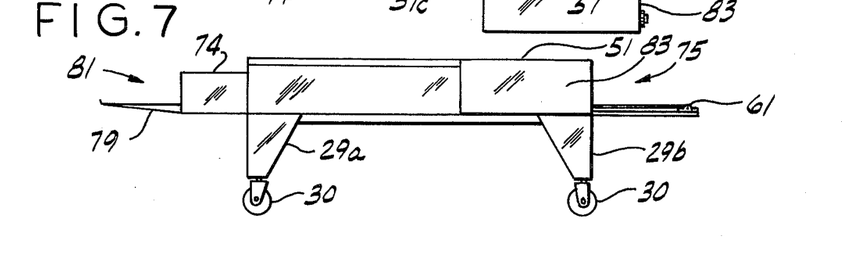
FIG. 7 is a side elevation of a single tier in-line conveyor tunnel oven of the type shown in FIG. 5.

Referring now to FIGS. 5–7, an oven of a so-called in-line character is illustrated. FIG. 5 specifically demonstrates a multiple tier oven B having two tiers 51a and 51a', each having a rectangular oven enclosure 53, 53a' respectively, which enclosures are joined by stacking of successive units in the manner suggested by FIG. 2 and so as to provide multiple tunnels 55, 55' respectively. Said units are secured together by stacking in the manner suggested by FIG. 2. Each of units 53, 53' is constructed of a rectangular enclosure of the same general size and configurations as employed for units 21, 21' of a stacked multiple tier oven of the first type shown in FIG. 2, there being a common face plate 57a, a top 57b, rear face 57c, bottom 57d, and right and left ends 57e 57f of the oven. The separate nature of the individual tier units is indicated by a phantom line 59 between them. The tunnels 55, 55' of the separate units are shown in FIG. 8 and FIGS. 11-13, it being understood that a similar framework F is employed for both the return conveyor oven A and the in-line conveyor oven B. Legs 29a and 29b of the same kind as employed for oven A provide a base of oven B, said legs being again provided with castering-type wheels 30, for permitting oven B to be mobile like oven A.

FIG. 6 is a top view of oven B, illustrating its advantageous shallow depth. Although oven B is shown with multiple tiers, an in-line conveyor oven of the same modality may have only a single tier 51 as shown in FIG. 7 but with the characteristic features of each tier being essentially of identical character yet stackable one above the other to provide the requisite number of tiers.

With tier 51 being representative, therefore, of the character of any of the tiers of such a multiple oven as that shown in FIG. 5, corresponding elements of successive tiers stacked upon tier unit 51 are designated by corresponding numbers followed by a prime symbol.

Accordingly, each tier unit has a respective in-line conveyor 61,61' for conveying food products through the respective tunnel 55,55' of each tier from its entrance to its exit. Each conveyor 61,61' comprises an endless belt 63,63' constructed of metal mesh, each belt having a first reach which passes over the tunnel hearth and a return reach which passes under the hearth as subsequently explained relative to FIG. 8, but with movements through the respective tunnel being indicated by arrows designated 65,65'.

The oven framework has frame members as shown at 67a,67a' and 67b,67b' which extend longitudinally outward from the opposite lower corner of the tunnel entrances, which are now designated 69,69'. Journals 71a,71a' and 71b,71b' are provided at the oven remote ends of these frame members for carrying rollers for each of the conveyors. Rollers are also journalled at the opposite end for each tier conveyor at 73,73', but are driven by a suitable DC motor and reduction gearing of conventional type contained within a respective housing or enclosure 74,74' extending a short distance outwardly from one side of each tunnel exit (see FIG. 6).

FIGS. 6 and 7 illustrate the nature of the conveyor and conveyor drive arrangement. Thus, in FIG. 6, the upper conveyor is shown to be mounted so that its tunnel entrance end is positioned more remotely from the oven enclosure 57 than the opposite end of the conveyor to provide a loading zone 75' for placing food products on the conveyor. The opposite discharge end of the conveyor is designated 77'. Adjacent the latter a heated product discharge shelf 79' provides an off-loading zone 81', there being corresponding elements of the lower tier, of course, with FIG. 7 illustrating the provision of an on-loading zone 75 of the single conveyor 61, a lower discharge shelf 79, as well as the off-loading zone 81.

Located within a control console or enclosure 83 presented at one side of each of the tunnel entrances 69,69' are process time control units 85,85' for each of the oven tiers, each time control unit having the same means such as thumbwheel or pushbutton digital select switches 87,87' for preselection of a processing time during which a food product, for example, will be conveyed from the entrance to the exit. These controls are of the same type described as utilized for oven A, being disclosed in the above-mentioned Weinberg et al application, Ser. No. 819,151.

Also located at the face of control console 83 are sets of temperature setting controls 88,89' and 91,91' for selection of lower and upper source temperatures for each oven tier, respectively. Again, these temperature controls are of the same type as described in connection with oven A. Accordingly, they permit separate preselection of hearth and roof emitter panel temperatures for each tunnel of oven B. Control console 83 may, as with oven A, be located at positions other than shown. Thus, in FIG. 5, the control console is at one position, but is shown in FIGS. 6 and 7 at another position, illustrating the configuration flexibility and modular character of the new tunnel means.

As to both oven A and oven B, the various enclosure panels and base preferably are constructed of steel materials, e.g., enameled steel or stainless steel. However, the details of such construction are not critical to an understanding of the invention.

Figure 8:
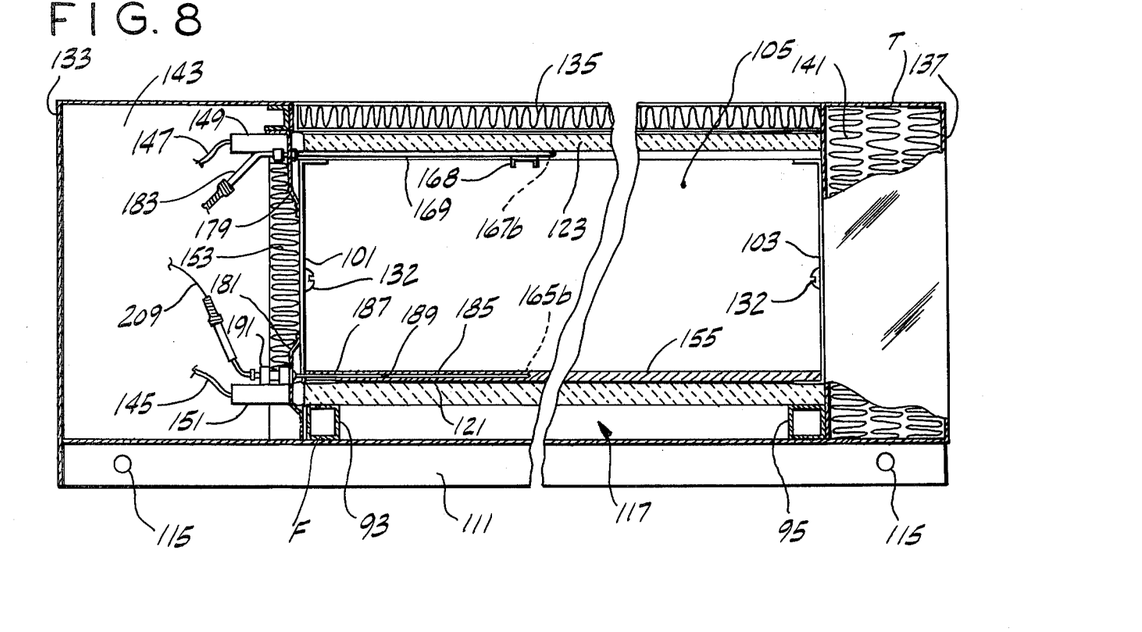
FIG. 8 is a transverse cross-section of an oven chamber of a tunnel oven, said oven chamber being utilized in both the return conveyor and in-line conveyor ovens of FIGS. 1 and 5 respectively and specifically one form of temperature sensing arrangement which is preferred in accordance with the invention.

Referring to FIG. 8, there is shown a representative oven tier unit T in transverse cross-section which common to either of ovens A and B, being formed by a frame F of box-like construction, the frame members being of rigid material, e.g., welded steel stock.

More specifically, framework F comprises a pair of longitudinal tubular frame rail members 93, 95 of rectangular cross-section. Said members may extend substantially only the length of the oven enclosure if a return conveyor type oven A is to be provided. Or, they may extend substantially beyond the ends of the enclosure, as in oven B, where in they may constitute those members 67a,67b, or 67a',67b' which carry the in-line conveyor rollers.

Extending vertically upward from frame rails 93,95 are corresponding channel-section members 107,109 which provide the interior or side walls of an oven chamber 105 defined by the tunnel. A pair of main transverse frame members 107,109 (FIG. 9) extend between sheets 97,99 said members being located above the upper surfaces of frame rails 93,95. Secured to the lower edges of the frame rails are L-shaped transverse mounting members 111,113 which preferably have apertures at opposite sides as indicated at 115 for fastening tier unit T to a tier unit immediately below it to permit stacked tiers to be secured together in a multiple tier oven. A space 117 is present between rails 93,95 not only to provide an air gap for achieving a predetermined degree of thermal isolation between stacked decks, i.e., tier units, but also for a reason explained below (See FIG. 8).

Figure 9:
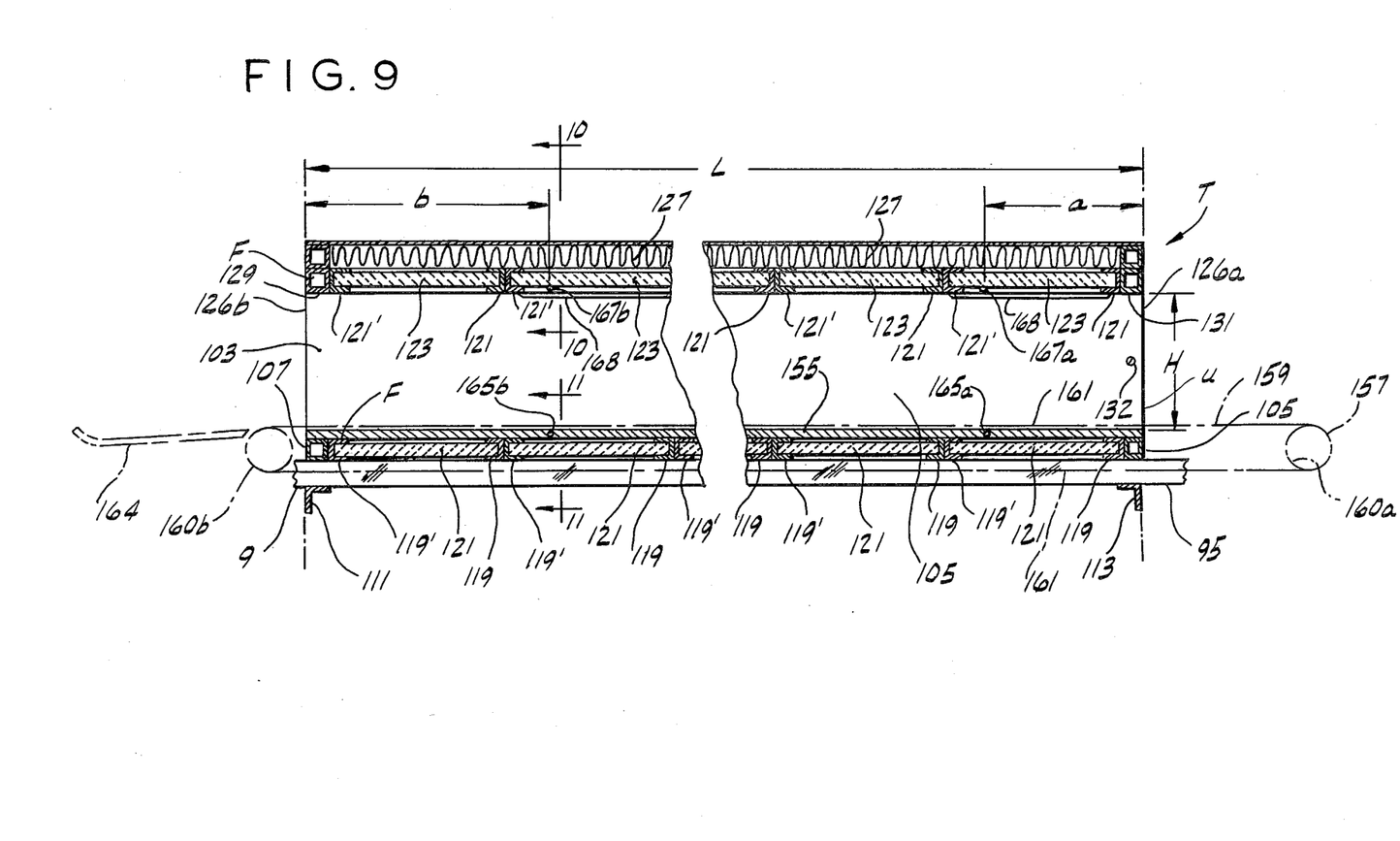
FIG. 9 is a longitudinal cross-section of an oven chamber of the invention showing both upper and lower portions of the chamber, and specifically illustrating upper and lower infrared emitter panels of the chamber.

Referring to FIG. 9 coplanar with frame members 105,107 are a series of U-shaped pairs of channel members 119,119' which extend the width of oven chamber 105, the channels of each pair opening toward one another to receive and retain marginal portions of discrete heater panels 121 of an infrared emitter type. Six of the panels typically may be retained in this manner to provide a continuous planar series of the panels extending substantially the width and length of the oven chamber. The infrared emitter panels preferably are of the type as described in Wells U.S. Pat. No. 3,809,859 issued May 7, 1974, herein incorporated by reference.

Channel-shaped transverse members oriented in a set of pairs 121,121' also extend across the width of the oven chamber at the top thereof between plates 101,103, again with the channels of each pair opening toward each other to receive infrared emitter panels 123 of the same type as panel 121.

A layer 127 of fibrous thermal insulation of suitable refractory material provides thermal isolation between the top of the oven and the upper heating panels 123, of which there are preferably six. These heating panels extend substantially the length and breadth of oven chamber 105 in coplanar relationship, and constitute the roof of the tunnel.

At each end of the sets of the panel-receiving transverse channel members 121,121' are main transverse members 129,131 of channel-form or tubular cross-section, as desired, for strengthening of frame F at the level of the tunnel roof, being located adjacent the tunnel entrance 126a and tunnel exit 126b, respectively, and corresponding to lower frame members 105,107.

It is important to note that these various frame members which carry the upper and lower heating panels 121,123 are joined as an integral unit by securement thereto of side walls 101,103. Also, the hearth 155 is supported by this integral unit, being carried by transverse members 119,119' as shown. In addition, the thermocouple probes are carried by the same structure since they will be seen mounted to covers or panels which are secured to tunnel side wall member 101. This integral unit U is then supported upon longitudinal frame members but is secured to the oven otherwise solely by the provision of screws 132 through the side wall members 101,103 proximate one end only of the tunnel for securement to over structural members. Consequently, thermal expansion or contraction longitudinally resulting from temperatures to which the members of this integral unit are exposed during operation of the oven, as compared with its cooled and inoperative state, are carried within this structure and are not coupled to the remaining structure of the oven. The end of the unit U remote from screws 132 is thus seen to be free to move relative to the remaining structure of the oven without causing undue stresses within the oven which otherwise could cause damage to the temperature sensing elements, electrical connections, or which could also cause bending, warping, or buckling of various panels of the oven structure.

Referring again to FIG. 8, it will be observed that the entire oven tier unit is then provided with an outer enclosure including a front face 133, top 135, and rear face 137 of sheet metal which enclose framework F and the tunnels 105 defined by the framework. A volume 139 between oven rear wall 103 and rear face 137 of the tier unit is filled with thermal insulating material 141 of suitable material, such as layers of glass fiber.

A somewhat large volume 143 is located between the front face 133 of the unit and front wall 101 of the tunnel, providing for the interconnection of various electrical power leads for heater panels 121 and 123 as well as for temperature sensing controls and motor controls, etc. as explained in greater detail below. However, it is sufficient for the present to note that each of the six panels 121 at the bottom of the tunnel and the six panels 123 at the top of the tunnel, electrical power at a suitable voltage provided by AC utility service (e.g., 208, 230, or 460 volts) via temperature control switching circuits and thence by circuit leads representatively shown at 145 for the lower panels and at 147 for the upper panels. Porcelain wire insulators 149, 151 provide protection of these leads at their points of passing through wall 101 which latter is faced with a layer 153 of thermal insulation, e.g., of glass fiber.

While reference is made to the front face 133 and front tunnel wall 101, and corresponding rear structure, it should be understood that much front-rear designation is a matter of choice since, as will be apparent, the various electrical and control connections can be made at the rear, rather than the front of the oven without any functional differences as to the operation of the oven. Accordingly, dependent upon placement of the control console, orientations from front to rear may be reversed as desired.

Referring now again to FIG. 8, the oven chamber or tunnel 105 of thermally conductive sheet material such as steel which extends the length and breadth of the tunnel-form chamber 105 and constitutes the floor thereof. Said plate 155 is supported on members 105,107, and 119,199' (see FIG. 9) and serves as a hearth of the oven chamber, being referred to hereinbelow as a hearth.

Suitable materials for hearth 155 include but are not limited to cast steel, rolled carbon steel, high-temperature aluminum, copper alloy, or various composite constructions ranging from not less than about 1/16 in. (1.6 mm.) to about ½ in. (12.7 mm.). A carbon steel hearth with thickness of ¼ in. (6.35 mm.) has been found especially satisfactory in use but with specifically preferred thickness being from about ⅛ in. (3.2 mm.) to ¼ in. (6.35 mm.).

Food or other products are conveyed through the entire length of the oven chamber from the entrance to the exit, by either the return type of conveyor of oven A or in-line type of conveyor oven B, with the product preferably being slightly elevated from hearth 155, e.g., about 1/16 in. (1.6 mm.), constituting the thickness of the conveyor racks or chain belt. Such spacing of products above the hearth along its length is found to produce more uniform heating and to eliminate "cold spots" of the hearth. During transit through the tunnel, which remains open at both ends, the products are heated by absorption of infrared radiant energy, in distinct contrast with conventional ovens which employ flames, glowing elements, heated entrapped air, heated forced air, or simple direct transfer of heat from the element to a vessel by conduction to the vessel placed in contact with the element.

FIG. 9 schematically depicts, in phantom lines, a conveyor 157 of the in-line configuration having a continuous belt 159 stretched between rollers 160a, 160b to provide a first reach 161 resting on hearth 155 and a return reach 163 passing below the lower set of infrared heater panels 121. A shelf 164 for discharge of heated products is located adjacent roller 160b. The width of lower reach 163 is slightly less than the transverse spacing between the main rails 93, 95. Hence, the space 117 below the lower heating panels 121 and brackets 111, 113 provides convenient routing of the return reach 161 of the belt-form conveyor. But a further advantage is that the return reach will be kept heated to a certain extent by infrared thermal radiation from panels 121 so as to minimize the amount of heat absorbed by the belt as the thermal mass of its metal mesh or other material is continually introduced with the tunnel. Whether the in-line or return type conveyor are employed, articles of food or other products are transported through the oven just above the hearth and thus receives infrared radiant energy from the hearth and the roof emitter panels.

It will now be manifest that hearth 155 will receive infrared radiant energy from panels 121 below the hearth thereby to serve as one source of heat for products conveyed through the oven. Panels 123, being also of an infrared emitter type as above noted, provide another source of heat for such products.

This arrangement has been proven to be far superior to prior types of ovens such as those identified above and to be extremely efficacious for the warming or more vigorous cooking, such as baking, broiling, or frying, of various comestibles. In contrast with rotary or other cooking methods, e.g., involving closed chambers or those in which heated gases are utilized for heating of food products, the present arrangement produces heating of food products by infrared emission from the hearth 155 and roof emitter panels 123. Heating in this way imparts heat to both sides of food products without requiring them to be turned over. Even more importantly, food products are heated yet remain moist and succulent without being undesirably dried as almost invariably occurs with other forms of heating. Additionally, food products are heated more quickly than with other methods yet with far less energy then comparable cooking arrangements of previously known types.

Because of the wide variety of products which can be heated in the oven, and particularly a spectrum of different types of foods and various-sized portions, provision is made for precisely selecting and maintaining the temperatures of both the hearth 155 and roof emitter panels 125 which constitute sources of heat products conveyed through the tunnel.

Referring to FIG. 9, pairs of temperature sensing elements 165a,165b and 167a,167b are provided for direct sensing (as opposed to conventional indirect sensing) of the temperature of the hearth and roof panels. These temperature sensing elements are constituted by thermocouple probes which are substantially at the same temperatures as the respective sources of heat. Accordingly, thermocouples 165a,165b are in intimate thermal relationship with hearth 155, while thermocouples 167a,167b similarly are located immediately adjacent the lower radiating surfaces of two of the roof emitter panels 123 and preferably also are intimate thermal relationship with the upper elements. For this purpose, light gauge channels 168 are carried between spaced pairs of transverse members 121,123 for the purpose of forcing the probes against upper emitter panel 123. Accordingly, by the expression intimate thermal contact is to be understood that the temperature sensing element, whether thermocouple, thermistor, or RTD (resistance temperature device) must actually contact the infrared heating source, such as heating panel or hearth so as to respond to the temperature of the panel rather than to the receipt of radiant energy therefrom.

The preferred upper thermocouple arrangement is illustrated in FIG. 8 where a thermocouple probe designated in its entirety 169 is shown to extend transversely through the tunnel side wall 101. Each said probe is of a commercially available type of suitable electrical characteristic, but carries the thermocouple temperature sensing element 167b at its distal end with the same being positioned at a central location relative to the tunnel walls.

Figure 10:
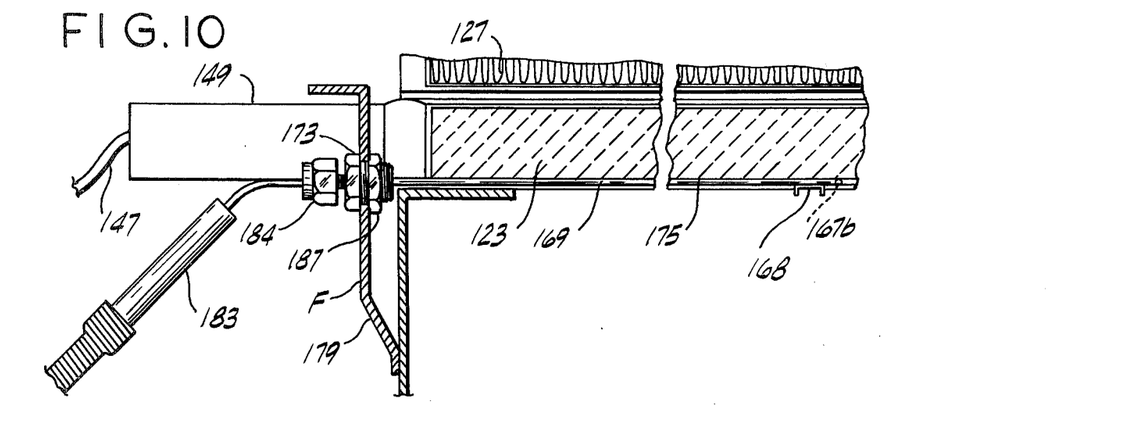
FIG. 10 is a fragmentary transverse cross-section of an oven chamber preferred in accordance with the invention and taken along line 10—10 of FIG. 9, illustrating certain infrared emitter panels and temperature sensing means therefor at the top of the oven chamber.
Figure 11:
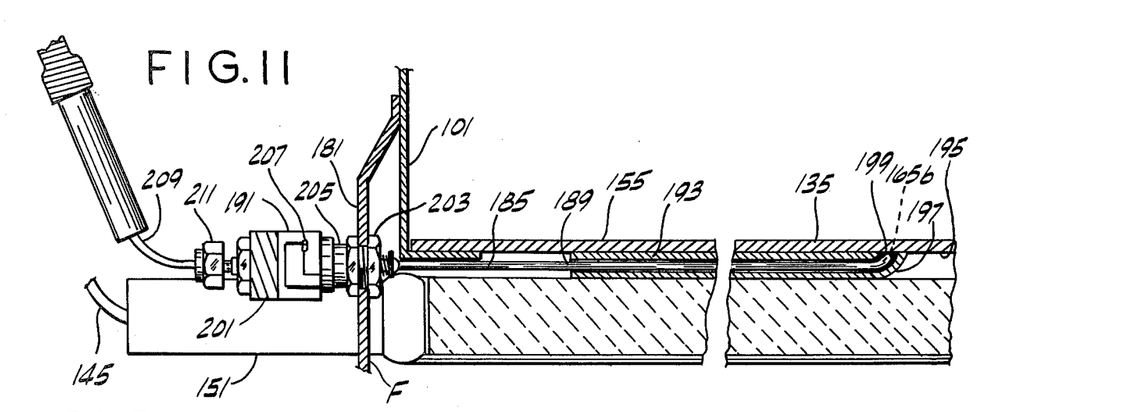
FIG. 11 is a fragmentary transverse cross-section, similar to FIG. 10, and taken along line 11—11 of FIG. 9, illustrating lower infrared emitter panels of the oven chamber, a hearth heated by the same, and a temperature sensing arrangement for sensing the temperature of the hearth different from that shown in FIG. 8.

Referring to FIG. 10, each upper thermocouple probe more specifically includes a relatively long, thin tubular element 171 extending laterally from a feedthrough fitting 173 so as to lie at the surface 175 of an associated upper infrared emitter panel 126, said fitting 173 having nuts 177 threaded thereon for securement of the fitting within a suitable aperture of a sheet cover extension 179 of oven wall 101. Said extension 179 is merely a race cover extending along the length of the oven. A similar cover 181 is utilized along the lower portion of the oven, as shown in FIGS. 8 and 11. While covers 179 and 181 are found to be an expedient for oven construction, other arrangements for mounting the thermocouple probes may be utilized, consistent with critical placement of the probes in accordance with the invention. Probe 169 is connected with a temperature controller of commercially available type by means of a lead 183 as explained more fully below, said lead being secured to the probe by a compression fitting 184.

Referring now to FIG. 8, a first of two preferred embodiments of the lower thermocouple probe assemblies is designated in its entirety 185, there being a thermocouple temperature sensing element 165b at the distal end a long thin tubular element 187 which extends transversely through oven wall 101 and through a blind lateral bore for guiding the probe in hearth 155. A spring-loaded bayonet fitting 191 biases the distal end of the probe containing element 165b so that it is maintained in contact against the end of the bore for maintaining the element in contact with the hearth to provide an intimate thermal conductive relationship with the hearth.

Alternatively, a lower probe arrangement as disclosed in FIG. 11 may be employed. There, indicated at 193 is a length of tubing which is secured, as by welding, to the lower surface 195 of hearth 155, with one end 197 of being bent toward that surface thereby to serve as a guide for the temperature probe. The tubular element 187 of probe 185 is shown to extend through tubing 193, and by virtue of its inherent flexibility, follows the curvature of tubing end portion 197 so that the distal end of the probe contacts surface 195 to provide an intimate thermal relationship between hearth 155 and the temperature sensing element 165b.

This relationship of contact with the hearth is maintained by the force of the spring-loaded bayonet fitting 191, it being understood that such fitting is of conventional type having a compression spring within a housing 201 for urging probe element 189 outwardly from the fitting, i.e. to the right as viewed. A pass-through fitting 203 extends through an aperture in race cover 181, being secured by a nut 205 and carrying bayonet pins, as shown at 207, which are engaged by fitting 191. The thermocouple element is connected by a lead 209 with a temperature controller, as explained below, again employing a compression fitting 211. Identical connections are made if a lower probe of the configuration shown in FIG. 8 is employed.

The upper and lower pairs of thermocouples are connected to respective upper and lower temperature controllers. Such controllers may be of commercial type suited for maintaining precise temperatures by proportional control, i.e., by switching on or off heater panels in accordance with the temperatures sensed by the thermocouples of each pair of probes. FIG. 12 illustrates such a temperature controller 213 which shown supplied with AC power at a suitable voltage as specified above by means of a pair of circuit leads 215, 217. For purposes of simplifying illustrations, FIG. 12 represents over tier unit T as having a pair of infrared emitter panels P1 and P2 although, as recognized, there may be several such panels, but all being connected in parallel by means of common power leads 219, 221. When controller 213 energizes panels P1 and P2, the full AC supply voltage is provided to the panels.

The two thermocouple elements of a pair, whether upper or lower, are designated TCa and TCb, for the purposes of the schematic diagram constituting FIG. 12, with element TCa being that closest to the tunnel entrance; element TCb, the exit. Although placement of the thermocouples along the length of the tunnel heating zone relative to the entrance or exit, i.e., beginning or end of the zone, is a matter of importance which is discussed below, it is desired also that the circuit interconnection of the thermocouples TCa and TCb with the associated controller 213 and operation of the latter being such that the temperature controller is responsive to the arithmetic means of the temperatures respectively sensed by elements TCa and TCb and for this purpose these elements are connected in parallel circuit relationships with input leads 223, 225 of controller 213. The controller is preferably capable of regulating temperatures within a relatively wide range, e.g from about 200° F. (93.5° C.) to about 900° F. (482° C.).

Thermocouple probe units which may be utilized in constructing the invention are commercially available from the Barber-Colman Company of Rockford, Illinois, by type designation SK3257. Similarly, the controller is a proportioning type controller (for example, series 125B also available from the same company) and operable to provide temperature control by switching the infrared emitter panels on and off at a relative rapid rate, such as at a cyclic rate of about 3Hz, with the band of proportioning control being typically about 30° F. (16.7° C.) in width. Proportioning may vary from cyclic rates at or above power line frequency (60Hz) to as low as approximately 4–5 seconds, as a preferred range, with higher rates being generally the more preferred. With regard to the proportioning band, it will be understood that the heater panels are energized for a selected portion of the cycle and that the energization interval in each cycle is a function of the temperature sensed, as compared with the selected temperature, energization being continuous for temperatures below the proportioning band but nonexistant if above.

Referring now to FIGS. 8 and 9, it can be appreciated that temperature sensing elements TCa and TCb of FIG. 12 correspond either to thermocouples 165a, 165b or 167a, 167b and that the length of the tunnel designated L in FIG. 8, constitutes the length of a heating zone of the oven. However, multiple zones may be employed, as explained below, so that it should be manifest that placement of the thermocouples is determined relative to the length of a zone in which products are to be heated at predetermined temperatures, rather than relative to the overall length of an oven unit. The letter H designates the height of the tunnel, or zone, as the case may be, but being a dimension of relevance for placement of the temperature sensing elements relative to the length of the length of the heating zone.

Positioning of the thermocouple sensing elements relative to the beginning and end of the heating zone (in the case of a tier unit T as shown, relative to the entrance 126a and exit 126b thereof) is a matter of critical importance in order to provide the efficacious temperature control capabilities and characteristics of an oven of the invention. For these and other purposes consistent with objects of the invention and to achieve synergism in operation of the oven, it is important to place the first sensing element predetermined distance from the beginning of the heating zone so that it is responsive to ingress of cool products to be heated within the oven tunnel. Where the heating zone within the tunnel has a length L and a tunnel height H, as represented in FIG. 9, the first sensing element is placed a distance from the beginning of the zone within the range of from about H to about 0.3L, as a prefrerred range.

Similarly, it is important that the second sensing element be placed a predetermined distance from the end of the heating zone. In a tier unit of the configuration described, preferably the second sensing element is placed within the range of from about H to about 0.3L. For example, a typical single-zone tunnel oven may have a tunnel length L of 72 in. (183 cm.) and a tunnel height of about 6 in. (15.2 cm.), so that the first and second thermocouples are each located respective distances of from about 6 in. to about 0.3×72 in., or 21.6 in. (55 cm.), from the tunnel entrance and exit, respectively.

Such considerations apply to placement not only of the lower pair, but also to the upper pair, of temperature sensing elements. It should be understood that an oven of the present invention well may employ but a single pair of temperature sensing elements for directly sensing a source temperature, whether the source be a hearth of the character described, or infrared emitter panels along the tunnel roof.

However, it is much preferred to employ upper and lower pairs of temperature sensing elements, as shown, with temperature controllers which are separate and independent for the upper and lower infrared heat sources. Therefore, it is inherently encompassed by the teachings of the present disclosures that the respective first upper and lower sensing elements, or second upper and lower elements, as the case may be, need not be aligned as they have been depicted in the drawings, even though that is preferred. For example, the first upper sensing elements (e.g. thermocouple 167a) may be located farther from the beginning of the zone than the first lower sensing element (e.g., thermocouple 167a). Similar considerations apply to the second set of sensing elements.

It is within the province of the invention to provide a tunnel oven of the general configuration described and shown but having multiple heating zones. Thus, referring to FIG. 13 products may be heated to a first temperature while traversing the length L1 of a first zone Z1 and then to second temperature while traversing the length L2 of a second zone Z2. But each zone is provided with multiple temperature sensing elements positioned relative to the beginning and end of each zone according to the criteria previously set forth. Hence, zone Z1 includes first and second sensing elements TC1a and TC1b; zone Z2 includes sensing elements TC2a, TC2b. Of course, these sensing elements, which may be thermocouples, can be provided in sets of upper and lower pairs for each oven zone, as hereinabove described.

When a multiple zone configuration is employed, the invention may thus be utilized in providing multiple temperature sensing elements in each zone with the first sensing element in each zone being responsive to ingress of temperature and other thermal characteristics of products which enter the zone. When used in this way, each pair of thermocouples (or other temperature sensing elements) may be connected, as shown in FIG. 13, to a respective temperature controller 223, 225 of the same type as controller 213. Each controller is connected to separate infrared panel emitters P1' and P2' associated with each zone for providing AC power thereto, by proportioning as a function of the respective temperatures sensed by the sensing elements, from AC power leads 227, 229.

In the operation of a tunnel oven of the invention, it is significant to observe that, fundamentally, the first thermocouple of each upper and lower pair is placed for being responsive to ingress of cool products to be heated within the tunnel. Assuming that food products, for example, are to be heated at 400° F. (203° C.) but that frozen items are to be introduced to the oven in frozen or chilled conditions, substantially heat will be transferred from the roof emitter panels 123 and portions of hearth 155 near the tunnel entrance, thermocouples 165a, 167a sensing a resultant temperature drop and causing their associated temperature controllers to provide additional heat. However, thermocouples 165b, 167b do not sense such need for increased heat. Since the controllers respond to the arithmetic mean of the temperatures sensed by the sets of thermocouples, temperature overshoot is precluded, preventing other food products from being burned or cooked unevenly. In practice it is found that temperature differentials along the entire heating zone, regardless of the amount or rate at which food products normally are conveyed, will not vary more than about 30° F. (17° C.) to perhaps 50° F. (28° C.) except within a few inches of the tunnel exit or entrance.

Placement of the thermocouple temperatures sensing elements, and proportional energization of infrared heat sources in accordance with the invention is thus found to provide nearly ideal temperature conditions within the oven chambers of the ovens, even through usage of the oven, whether constituted by a single tier or multiple stacked tiers as taught herein, may involve the introduction of various products having different sizes, densities, thermal masses, temperatures, and temperature absorption characteristics, and even though products may be introduced at markedly different rates. But whether products are introduced only sporadically or at full capacity, the new oven, though its highly effective new temperature sensing and control feature is appropriately responsive to such varying conditions to provide accurate, uniform, reproducible, and extremely stable operations, but consumes relatively little power when products are not being heated. Yet, products upon their introduction into the oven tunnel are heated rapidly and in a superior manner, and food products in particular are not dried out upon being heated, conducing to comestibles which are a delectation to the customer.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A tunnel oven comprising a framework said framework forming an elongated oven chamber in the form of a tunnel having an entrance at one end for ingress of products to be heated and an exit at the opposite end for egress of products heated in a heating zone in said tunnel, said entrance and said exit remaining open at all times during heating of said products, means for conveying products from said entrance through said tunnel to said exit, a hearth defining a floor of said tunnel at least along the length of said heating zone, electronically energizable infrared heater panels along the length of said hearth for providing a first source of infrared radiation for causing heating of said products by infrared radiations, said hearth being of heat conductive metal and constituting a further source of infrared radiation for causing heating of said products by infrared radiation means defining a roof of said tunnel, first and second temperature sensing elements for direct sensing of the actual temperatures of said hearth at points along the length of said zone remote from the beginning of the zone, means for maintaining said first and second temperature sensing elements in intermediate thermal relationship with said hearth, said first temperature sensing element being temperatures responsive to ingress of cool products to be heated in the tunnel, and first temperature controller means for controlling said infrared heater panels and responsive jointly to the arithmetic means of temperatures respectively sensed by said first and second temperature sensing means to provide predetermined temperatures in said tunnel without temperature overshoot or excessive temperature differential therein, said first and second temperature sensing element each comprising a temperature sensing probe comprising a relatively long, thin probe element and a temperature sensing device at one end of said probe elemnt, said means for maintaining said first and second temperature sensing elements in intimate thermal contact with said hearth comprising a respective guide for each said problem element for guiding each temperature sensing device to a respective point of thermal contact with the hearth and means for urging each probe element in a direction for causing the respective point of thermal contact of each temperature sensing device to be maintained with pressure, each said guide is oriented with respect to the tunnel for guiding said probe element to a point on the hearth located between the sides of the tunnel.

2. A tunnel oven as set forth in claim 1, said infrared heater panels being positioned along the length of said roof in said zone for radiating heat to said products, and further comprising a third temperature sensing element corresponding to said first temperature sensing element and provided for directly sensing the temperature of said infrared heater panels at a point along the length of said zone near the beginning thereof, a fourth temperature sensing element corresponding to said second temperature sensing element and provided for directly sensing the temperature of said infrared heater panels at a point along the length of the zone remote from the beginning thereof, said fourth temperature sensing element being temperature responsive to ingress of cool products to be heated in the tunnel, and further temperature controller for controlling said infrared heater panels in response to the arithmetic mean of temperatures sensed third and fourth temperature sensing elements.

3. A tunnel oven as set forth in claim 2, said infrared heater panels extending substantially the length of the zone above said hearth.

4. A tunnel oven as set forth in claim 3, said infrared emitter panels being disposed in a plane and constituting at least a part of the roof of the tunnel, said oven further comprising means for maintaining said third and fourth temperature sensing elements in intimate thermal relationship with said infrared emitter panels.

5. A tunnel oven as set forth in claim 4, the last-said means comprising a pair of relatively long, thin probe elements, said third and fourth temperature sensing elements including a pair of thermocouples each respectively carried at one end of a corresponding probe element, each of said probe elements extending generally laterally with respect to the tunnel to one of said emitter panels and located between the walls of the tunnel.

6. A tunnel oven as set forth in claim 2 wherein said first through fourth temperature sensing elements comprise first through fourth respective thermocouples, the first and second thermocouples being connected in parallel to said first temperature controller means, the third and fourth thermistors being connected in parallel to said further temperature controller means, said first and second thermocouples providing sensing of the arithmetic mean of the hearth temperatures respectively sensed by them, and said third and fourth thermocouples providing sensing of the arithmetic mean of the infrared emitter panel temperatures sensed by them.

7. A tunnel oven as set forth in claim 2, wherein said first and third temperature sensing elements are each positioned at a point along the length of the tunnel which is a predetermined first distance from the beginning of said zone, and said second and fourth temperature sensing means are each positioned at a point along the length of said zone which is a predetermined second distance from the end of said zone, said zone having a length L, said tunnel having a height H, said first and second distances each being within the range of from about H to about 0.3 L.

8. A tunnel oven as set forth in claim 2, each of said temperature controller means providing proportional control energization of respective heater panels.

9. A tunnel oven as set forth in claim 1, said framework being configured for being stacked in tier units to provide a multiple tier oven constituted by a plurality of units of said tunnel oven, said frame comprising means for securement of said frame to and above the framework of a lower tier unit in stacked relationship thereto.

10. A tunnel oven as set forth in claim 9, and securement means presenting an air gap between each pair of stacked units for achieving a predetermined degree of thermal isolation between stacked units.

11. A tunnel oven as set forth in claim 1, means for structurally interconnecting said framework, hearth and heater panels as an integral unit, and means for securing said unit within said oven for permitting thermal expansion or contraction of said unit within said oven without causing undue stresses, said oven having a body including structural members, said integral unit being positioned within said body, said means for securing said unit comprising means for fastening one portion only of said unit to said structural members whereby other portions of said structural unit are permitted to undergo thermal expansion or contraction without transferring undue stresses to said oven.

12. A tunnel oven as set forth in claim 1 further comprising means for automatically controlling the speed of said conveying means and means for programming said speed controlling means with a preselected heating time to cause said speed controlling means to convey a product from the entrance through said tunnel to the exit in said preselected heating time.

13. A tunnel oven as set forth in claim 1, said conveying means comprising an endless conveyor having an inner course within said tunnel over said hearth and an outer course within a plane coplanar with said inner course, said inner course of said conveyor being configured for maintaining products conveyed through said tunnel in relationship slightly elevated with respect to said hearth throughout the length of said hearth.

14. A tunnel oven as set forth in claim 1, said conveyor means comprising an endless belt having a first reach within said tunnel over said hearth and a return reach under said tunnel, said first unit of said conveyor being configured for maintaining products conveyed through said tunnel in relationship slightly elevated with respect to said hearth throughout the length of said hearth.

* * * * *

UNITED STATES PATENT OFFICE
CERTIFICATE OF CORRECTION

Patent No. 4,245,613          Dated January 20, 1981

Inventor(s) Harold D. Wells, Kelly J. Wells & Dennis M. Weinberg

It is certified that error appears in the above-identified patent and that said Letters Patent are hereby corrected as shown below:

Claim 1, Column 16, Line 47 "temperatures" should be ---temperature---.

Claim 1, Column 16, Line 52 "means" should be ---elements---.

Claim 1, Column 16, Line 56 "element" should be ---elements---.

Claim 1, Column 16, Line 59, "elemnt" should be ---element---.

Signed and Sealed this

Twelfth Day of May 1981

[SEAL]

Attest:

RENE D. TEGTMEYER

Attesting Officer      Acting Commissioner of Patents and Trademarks